July 21, 1942.  J. H. MURCH ET AL  2,290,200
ADHESIVE APPLYING MACHINE
Filed May 19, 1938  9 Sheets-Sheet 1

July 21, 1942.  J. H. MURCH ET AL  2,290,200
ADHESIVE APPLYING MACHINE
Filed May 19, 1938      9 Sheets-Sheet 3

INVENTORS
John H. Murch
Herbert F. Cox, Jr.
Howard M. Hill
John C. Robinson
Charles H. King
BY Iva D. Thornburgh
ATTORNEYS July 21, 1942.    J. H. MURCH ET AL    2,290,200
ADHESIVE APPLYING MACHINE
Filed May 19, 1938    9 Sheets-Sheet 4

Fig. 7

INVENTORS
John H. Murch
Herbert F. Cox, Jr.
Howard M. Hill
John C. Robinson
BY Ivan D. Thornburg
Charles H. Jones
ATTORNEYS July 21, 1942. J. H. MURCH ET AL 2,290,200
ADHESIVE APPLYING MACHINE
Filed May 19, 1938 9 Sheets-Sheet 6

Fig. 9

INVENTORS
John H. Murch
Herbert F. Cox, Jr.
Howard M. Hill
John E. Robinson
BY Ivan D. Thornburgh
Charles H. Cife
ATTORNEYS

July 21, 1942.　　J. H. MURCH ET AL　　2,290,200
ADHESIVE APPLYING MACHINE
Filed May 19, 1938　　9 Sheets-Sheet 7

INVENTORS
John H. Murch
Hubert F. Cox, Jr.
BY Ivan W. Thornburgh  Howard W. Hill
Charlie H. Cine  John C. Robinson
ATTORNEYS

Patented July 21, 1942

2,290,200

UNITED STATES PATENT OFFICE 2,290,200

ADHESIVE APPLYING MACHINE hn H. Murch, East Orange, and Herbert F. Cox, Jr., Madison, N. J., and Howard M. Hill, Bayside, N. Y., and John E. Robinson, Glen Ellyn, Ill., assignors to American Can Company, New York, N. Y., a corporation of New Jersey Application May 19, 1938, Serial No. 208,940

20 Claims. (Cl. 91—51)

The present invention relates to a machine for applying adhesive to web material and has particular reference to applying a thermoplastic adhesive, reduced to fluid form, in a desired pattern onto the web material while the latter is moving along a predetermined path of travel.

An object of the invention is the provision of a machine for applying a heated and fluid thermoplastic adhesive to web material in a desired pattern by means of an intaglio roller rotating in a bath of the adhesive.

Another object is the provision of such a machine wherein the thermoplastic adhesive is maintained in a fluid state and at a high temperature so that it may be readily applied to the web material by the intaglio roller rotating therein.

Another object is the provision of a machine of this character wherein the intaglio roller itself is maintained at a predetermined temperature so that the adhesive will not be chilled by the roller.

Another object is the provision in such a machine of a chilled pressure roller which holds the web material against the intaglio roller during the transfer of the adhesive onto the web and which chills and sets the adhesive immediately upon its reception by the web.

Another object is the provision of devices which operate to relieve the pressure on the pressure roller and which lift the web material from its engagement with the intaglio roller when for any reason the machine stops operating, so that the web will not be damaged.

Another object is the provision of means for continuing the rotation of the intaglio roller in its bath of adhesive but at a slower speed when the machine stops in its normal operation, in order to prevent burning and setting of the unused adhesive on the roller.

Another object is the provision of timing means which restores the slowly rotating intaglio roller to full speed in time with the other moving parts of the machine when the machine begins operating normally after a recess, so that the web material may be again brought into engagement with the intaglio roller at the proper place to continue application of the proper pattern of adhesive being applied by the roller.

Another object is the provision of such a machine wherein the intaglio roller and the pressure roller may be swung as a unit free of the adhesive bath so that these parts of the machine may be readily cleaned.

Numerous other objects and advantages of the invention will be apparent as it is better understood from the following description, which, taken in connection with the accompanying drawings, discloses a preferred embodiment thereof.

Referring to the drawings.

Figures 1, 2:
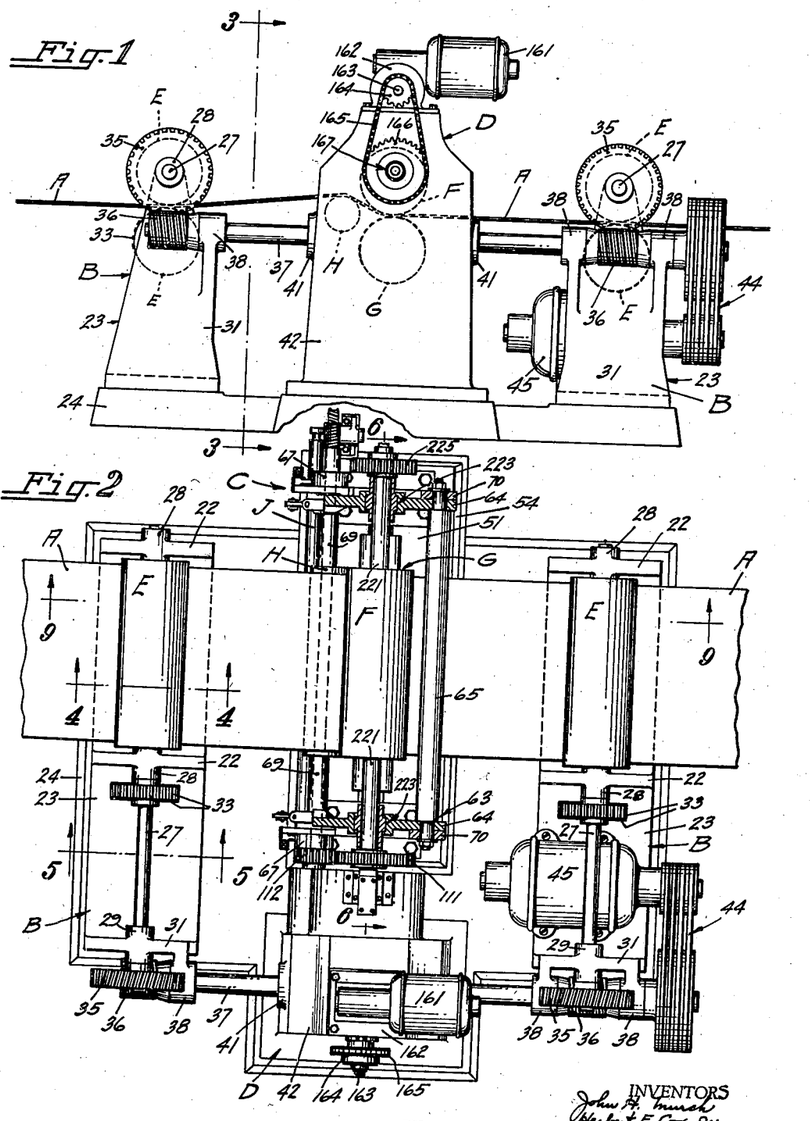
Figure 1 is a side elevation of a machine embodying the instant invention, the view showing a continuous strip of web material being passed through the machine.
Fig. 2 is a top plan view of the machine, with parts broken away, the view also showing a strip of web material in place.

As a preferred embodiment of the present invention the drawings illustrate an adhesive applying machine in which a strip A (Figs. 1 and 2) of web material, such as fibre or the like, is imprinted with a thermoplastic adhesive applied in a desired pattern as the web is advanced through the machine. The strip or web A may be substantially continuous, such as for example, a web fed from a roll of material or may be short strips or even sheets if desired.

For the purpose of facilitating the description and explanation in this specification, the machine may best be considered as including a plurality of web feeding or pull units B, an adhesive applying unit C, and a control unit D. There are preferably two feed units B one located on each side of the adhesive unit C.

The web A is preferably fed by pairs of feed or pull rollers E rotated in unison and located in the feed units B, the web being threaded between the rollers. These rollers feed the web through the adhesive applying unit C in which a pressure roller F presses the moving web against an intaglio roller G. During its travel through the applying unit the web is held taut by an idler roller H.

The intaglio roller G rotates in a bath of hot and fluid thermoplastic adhesive which is picked up by the roller as it revolves and which is carried toward the web. All of this picked-up adhesive except that contained within the pockets or intaglio recesses of the roller is scraped off by a doctor J which bears upon the periphery of the intaglio roller. It is this retained adhesive which is applied to the moving web in the pattern laid out on the surface of the intaglio roller.

Provision is made for relieving the pressure on the pressure roller F when for any reason the machine stops operating. This release of pressure effects a lifting of the pressure roller away from the intaglio roller G. That portion of the taut web A adjacent to the pressure roller also moves up and is thus drawn away from the intaglio roller. The intaglio roller continues to rotate when the machine stops but at a slower rate of speed and this prevents burning of the adhesive on the roller. Removal of the web from the intaglio roller when the machine is inoperative, prevents smearing or misplacing of the adhesive on the web and otherwise prevents damage to the web itself.

The feed rollers E of each feed unit B are preferably disposed one above the other. Each lower roller is mounted on a horizontal shaft 21 (see Figs. 1, 2 and 4) carried in suitable bearings formed in upright webs 22 of a sub-frame 23. The sub-frames are mounted on a support base 24. Each upper roller is mounted on a longer horizontal shaft 27 journalled in bearings 28 formed in the webs 22 and is also carried in an additional bearing 29 of a web section 31 of the sub-frame 23.

The shafts 21, 27 are rotated in unison by meshing gears 33 (see also Fig. 5) there being one gear carried on each of the shafts. It is this rotation feature which effects feeding of the web material through the adhesive applying unit C.

Actuation of the roller shafts 21, 27 of each feed unit B is made by a helical gear 35 which is mounted on the upper shaft 27 and which meshes with a helical pinion 36 carried on a longitudinally disposed main drive shaft 37. The main drive shaft is journalled in bearings 38 formed on the webs 31 of the sub-frames 23.

The main drive shaft 37 extends through the control unit D and is there journalled in bearings 41 formed in a control housing 42 which is bolted to the main base 24. This drive shaft is rotated in any suitable manner, as for example, by a belt and pulley connection 44 between the shaft and an electric motor 45 which constitutes the main driving motor for the entire machine.

The thermoplastic adhesive which is applied to the web material A as the latter is fed through the adhesive applying unit C is contained in a reservoir 51 (Figs. 2, 3, 6, 7, 9 and 10). Hot adhesive in a fluid condition is supplied to the reservior from any suitable source of supply and in any suitable manner, as for example, by way of an inlet pipe 52 which is bolted to a side of the reservoir.

Adhesive within the reservoir is maintained at a high temperature which ranges from approximately 250 to 400 degrees F. Maintenance of this temperature in the reservoir is effected by a heating medium acting through a heating jacket 53 which surrounds the reservoir and which is bolted to the top of a sub-base 54. The reservoir rests on top of the heating jacket so that an intervening space 55 is provided around the reservoir for the heating medium.

The fluid heating medium may be steam, hot water, hot oil or the like which circulates through the jacket space 55. Circulation is produced by way of an inlet pipe 56 and an outlet pipe 57 which are threaded into a side wall of the heating jacket. Webs 58 formed on the bottom of the reservoir and extending down into the heating space 55 direct the heating medium in a circuitous path of travel through the heating space.

The intaglio roller G is disposed in the adhesive reservoir 51 and is carried in a movable carriage 63 (Figs. 2, 3, 7, 8, 9, and 10) located above the reservoir. The carriage includes movable end members 64 which are tied together by a transverse tie rod 65. The end members are loosely mounted on a transverse shaft 66 which is carried in bearings 67 formed in stationary frame brackets 68. The brackets are bolted to the sub-base 54 adjacent the ends of the reservoir 51. The idler roller H and the pressure roller F as well as the intaglio roller G are all mounted in this carriage as a unit, the idler roller being carried on a sleeve 69 surrounding the shaft 66.

Figure 9:
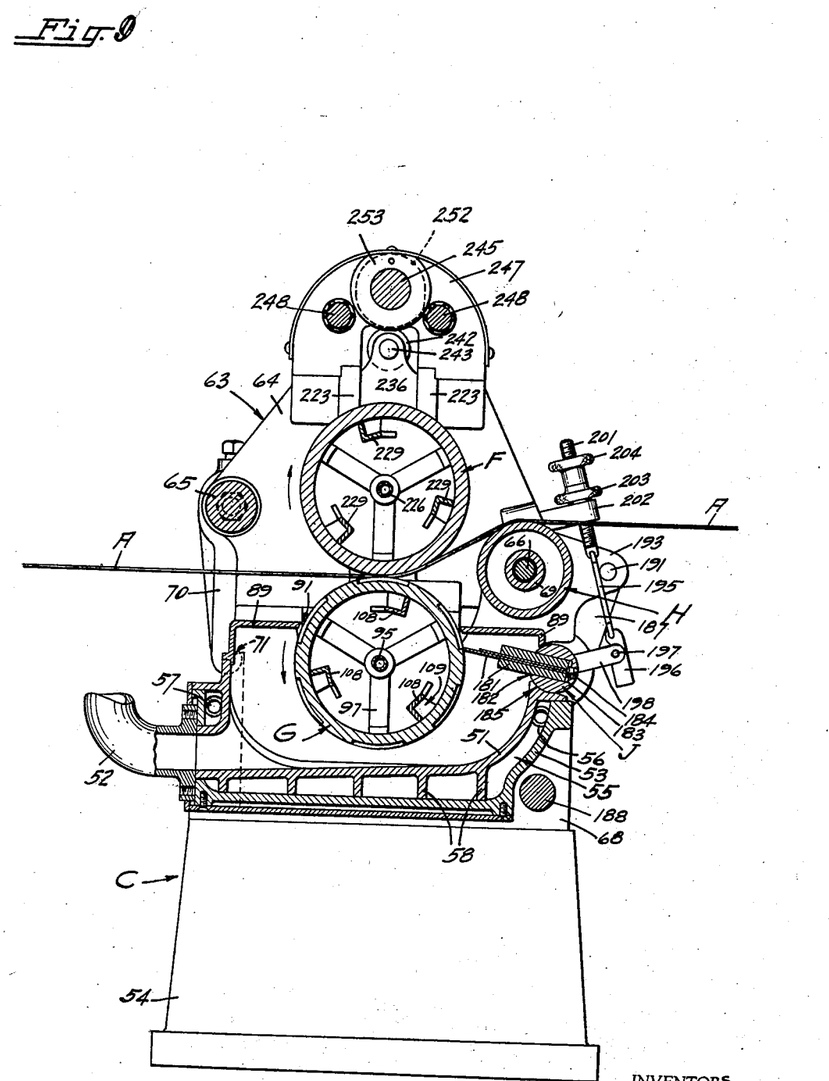
Fig. 9 is an enlarged longitudinal section taken substantially along the line 9—9 in Fig. 2, with parts broken away.
Figures 10, 11, 12:
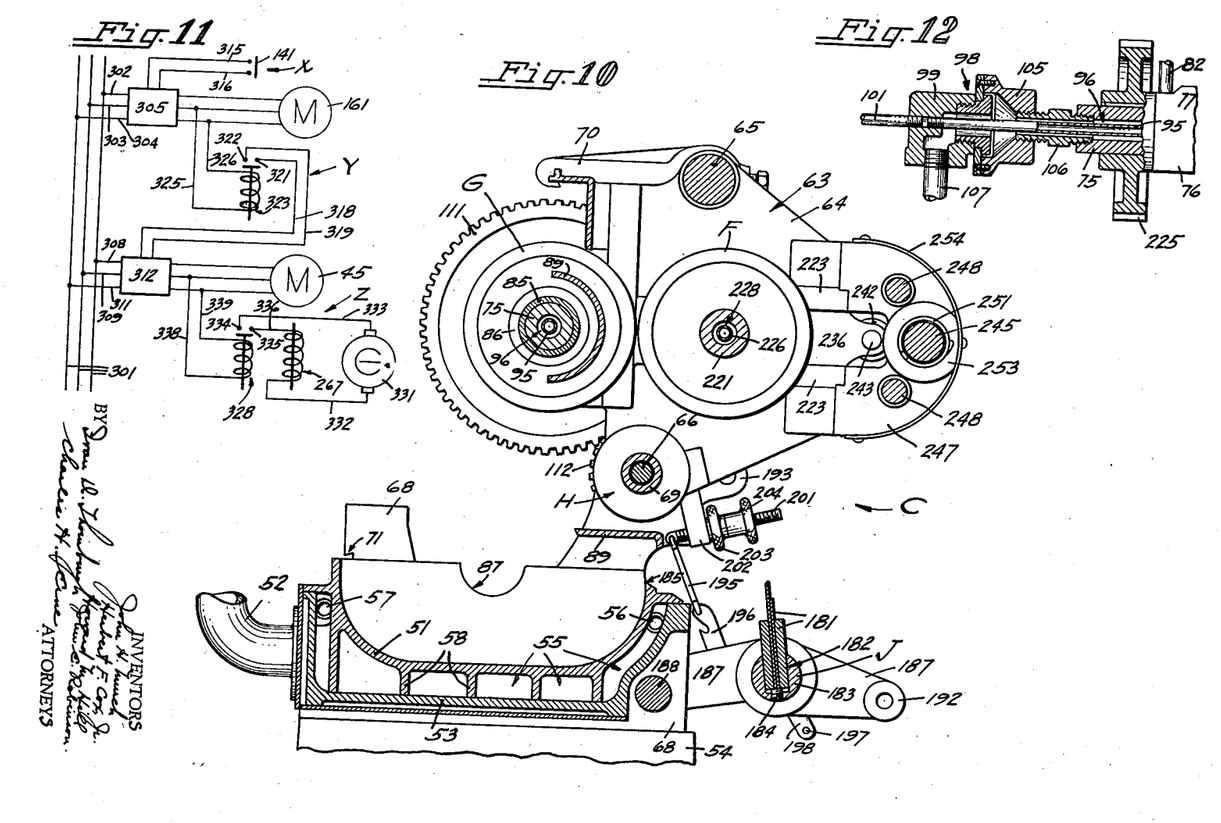
Fig. 10 is an enlarged sectional view taken substantially along the line 10—10 in Fig. 3 with parts of the machine in a different position.
Fig. 11 is a wiring diagram of the electrical circuits used in the machine.
Fig. 12 is an enlarged section taken substantially along the line 12—12 in Fig. 8.
Figure 13:
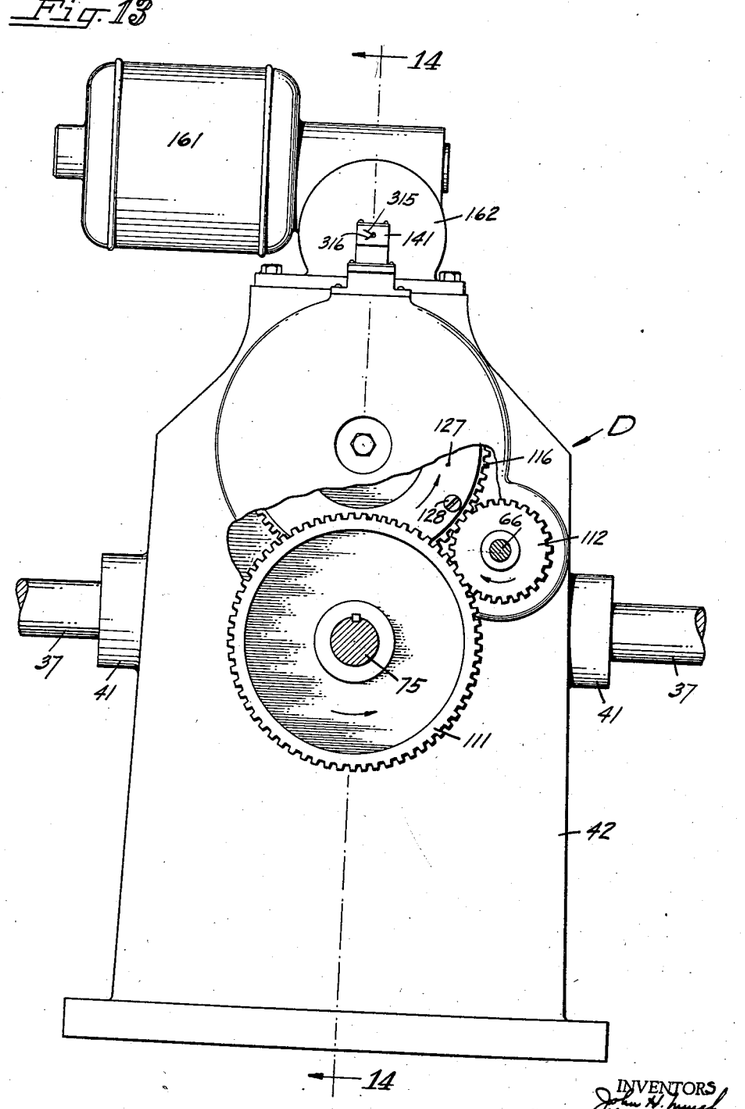
Fig. 13 is an enlarged partial end elevation and partial section as viewed substantially along the broken line 13—13 in Fig. 3, with parts broken away.

This carriage and frame construction allows hinging of the carriage back out of the way when desired as shown in Fig. 10 so that the rollers may be readily accessible for cleaning. When in operative position as shown in Fig. 9 the carriage is locked against displacement by latches 70 which are carried on the ends of the tie rod 65. These latches engage into notches or catches 71 formed on the frame brackets 68.

The intaglio roller G is mounted in the carriage 63 on trunnions 75 (Figs. 6 and 7) which are formed on the ends of the roller. The trunnions are journalled in bearings 76 formed in bearing blocks 77 (see also Fig. 8) which are bolted to the carriage end members 64. Clearance openings 78 are provided in the frame brackets 68 for these bearings.

The bearings 76 are preferably cooled because of their proximity to the adhesive reservoir 51. For this purpose the bearings are formed with internal channels 79 (Fig. 7) through which a fluid cooling medium, such as water or brine, may be circulated. Circulation is produced by way of inlet pipes 81 (Figs. 6 and 7) and outlet pipes 82 which are threaded into the bearings and which communicate with the channels.

Adhesive within the reservoir is prevented from coming into contact with the intaglio roller trunnions 75 and with the bearings 76 by deflecting sleeves 85 (Figs. 6 and 7) which surround the trunnions adjacent the ends of the rollers. These sleeves are formed with adhesive deflecting shoulders 86. The sleeves fit tightly into half bearings 87 formed in the top edge of the reservoir 51. The upper half of the sleeves are grooved as at 88 and a cover plate 89 (see also Fig. 9) is disposed over the reservoir and parts of the end walls of the plate extend into the grooves. This cover plate substantially encloses the reservoir, prevents foreign matter from entering and also minimizes heat losses from the adhesive contained therein. An opening 91 in the cover plate provides clearance for the intaglio roller G.

Provision is made for internally heating the intaglio roll G so that it will not chill the adhesive in which it rotates. For this purpose the roller is preferably hollow and a suitable fluid heating medium such as steam, hot water, hot oil or the like is circulated through it. Introduction of the heating medium into the roller is by way of an inlet tube 95 (Figs. 6 and 7) which extends through a bore 96 formed in the roller trunnion 75. The inlet tube is smaller in diameter than the bore so that there is a space around the tube.

The fluid inlet tube 95 extends nearly the full interior length of the intaglio roller and terminates just short of its opposite end. This end of the tube is supported in a spider 97 which is secured inside the roller. The entrance end of the tube extends through a hollow universal joint 98 (Fig. 12) and is threaded into a stationary element 99 of the joint. One end of a fluid supply pipe 101 connects with the stationary element 99 and communicates with the inlet tube 95.

A movable element 105 of the universal joint 98 is connected to the hollow trunnion 75 by a nipple 106. One end of the nipple is threaded into the movable element while its opposite end is threaded into the bore 96 at the outer end of the trunnion. The inlet tube 95 extends through this nipple in spaced relation therewith. The stationary element 99 is also connected to one end of a discharge pipe 107 which leads to any suitable source of deposit for the circulated fluid.

Thus hot oil or other heating fluid introduced into the roller G by way of the supply pipe 101 and inlet tube 95 enters the interior of the roller and after circulating therethrough flows out around the tube through the trunnion bore 96, through the nipple 106, the hollow universal joint 98 discharging by way of the outlet pipe 107. While inside the roller the fluid is agitated by helically curved vanes 108 (see also Fig. 9) having pockets 109 which pick up the fluid as the roller rotates and empty it back again with a splashing and agitating action.

Figures 14, 15, 16:
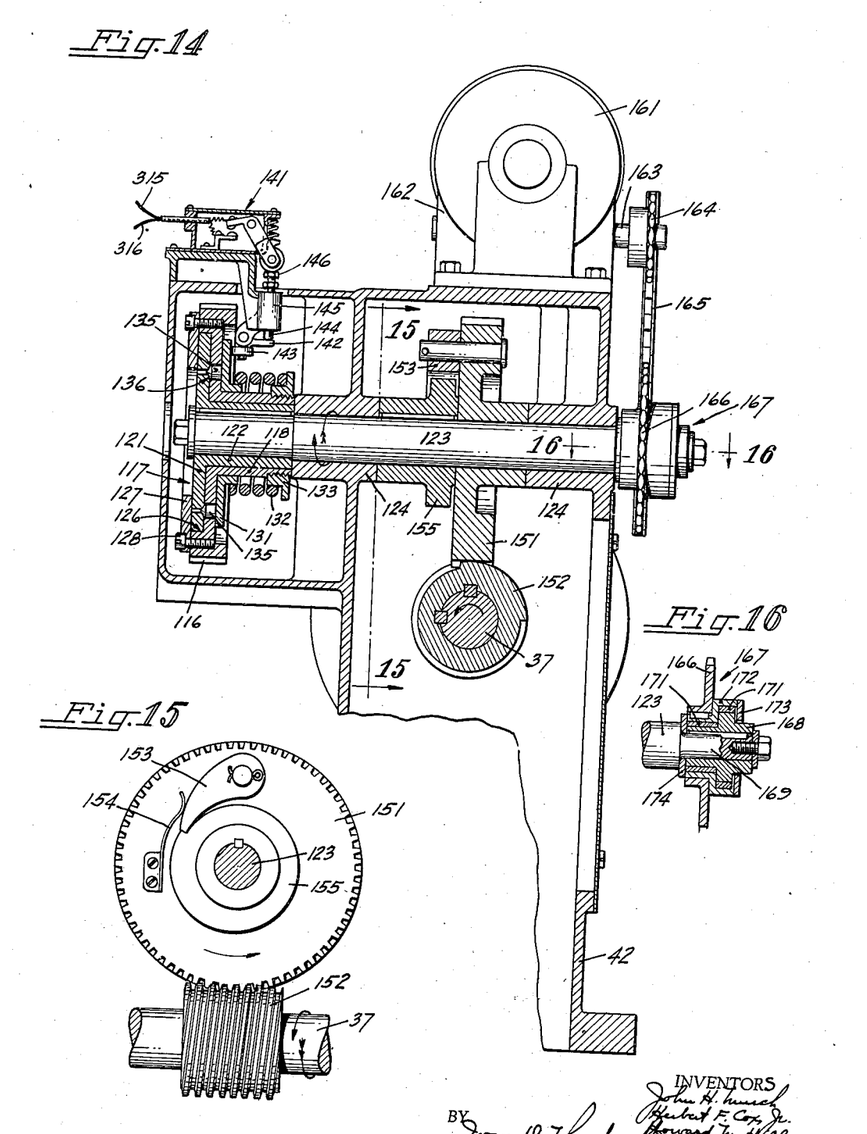
Fig. 14 is an enlarged section taken substantially along the broken line 14—14 in Fig. 13, parts being left out and parts being broken away.
Figs. 15 and 16 are sectional details taken substantially along the lines 15—15 and 16—16 in Fig. 14.

The intaglio roller is continuously rotated by driving devices located in the control unit D and acting on a gear 111 (Figs. 3 and 7) which is mounted on one of the roller trunnions 75. Gear 111 meshes with a pinion 112 mounted on a projecting end of the shaft 66. This end of the shaft is journaled in a bearing 114 formed in the control housing 42. Inside the housing the shaft 66 carries a gear 115 which meshes with a gear 116 of a friction slip clutch 117 (Fig. 14).

The slip clutch makes it possible to disconnect the intaglio roller from its driving means when for any reason the intaglio roller is held against rotation, such as when the adhesive in the reservoir becomes thick and stiff from cooling. This is the condition when first starting up the machine and such a provision prevents damage to the machine. The slip clutch will also act if there is an undue obstruction to the passage of the web over the roller.

Inside of the slip clutch 117, the gear 116 is formed with a sleeve hub 118. At one side the sleeve hub abuts an outer clutch plate 121 formed with a hub 122 which carries the sleeve hub. The hub 122 is keyed to a continuously rotating clutch shaft 123. This shaft is journalled in bearings 124 formed in the control housing 42. The hub 118 of the gear 116 is rotatably mounted on the hub 122 of the clutch plate 121. The clutch plate is disposed in a recess 126 formed in the outer face of the gear, the plate being retained in position within the recess by a flat ring 127 secured by screws 128 to the gear face.

The slip clutch is also provided with an inner clutch plate 131 which is held against the inner face of the gear 116 by a compression spring 132. This spring surrounds the gear hub 118 and is held in place by a nut 133 threaded on the end of the hub. The gear carries a plurality of clutch pins 135 having flat inner ends which rest against the inner clutch plate. These pins have conical outer ends which engage in conical depressions 136 formed in the adjacent face of the outer clutch plate. This is a usual clutch construction.

If the intaglio roller is held against rotation the clutch gear 116 is blocked and the rotating clutch shaft 123 thereupon unseats the clutch pins 135. This forces the inner clutch plate 131 inwardly against the compression of spring 132. The clutch pins are so staggered that once the pins are unseated the outer clutch plate must make one complete revolution before the pins can again seat into their proper depressions. This lateral movement of the inner clutch plate actuates an electric toggle switch 141 which stops the machine as will be hereinafter explained in connection with the wiring diagram.

The switch 141 is actuated by a bell crank lever 142 which is carried on a lug formed in the control housing 42. One leg of the lever carries a roller 143 which engages against the inner clutch plate 131. The other leg engages against the lower end of a vertically disposed pin 144 slidably carried in a bearing 145 mounted on the control housing. The upper end of the pin is provided with an adjustable set screw 146 which engages against the movable element of the switch.

As hereinbefore mentioned the intaglio roller G unless held against rotation is continuously rotated in the adhesive reservoir 51 even when the machine is stopped but under all conditions the driving is done through the clutch shaft 123. Under normal operating conditions the clutch shaft is driven by a loosely mounted helical gear 151 (Figs. 14 and 15) which meshes with a helical pinion 152 mounted on and rotated by the main driving shaft 37. Gear 151 carries a pawl 153 which is held by a spring 154 against a one tooth ratchet 155 keyed to the clutch shaft 123.

If the main driving shaft 37 should stop for any reason, as when the machine is stopped, the clutch shaft 123 is disconnected from the main driving shaft and is rotated by an auxiliary electric motor 161 (Figs. 1, 2, 3, 13 and 14). This motor operates at a slow rate of speed which is just sufficient to keep the intaglio roller in motion so that adhesive picked up by it will not be burned. The motor is part of a speed reduction unit 162 which is mounted on top of the control housing 42 and which is provided with a driving shaft 163. A sprocket 164 mounted on the driving shaft carries an endless chain 165 which takes over a sprocket 166 of an auxiliary slip clutch 167 mounted on the clutch shaft 123.

The auxiliary slip clutch 167 (Fig. 16) includes a stepped hub 168 which is keyed to a shouldered portion 169 of the clutch shaft 123 and is bolted at the end against endwise displacement. The steps in the hub 168 are surrounded by individual friction rings 171. A stepped sleeve 172 corresponding with the stepped hub fits snugly over the rings and is held in place by a flat annulus 173 which is secured to the large end of the sleeve. The sprocket 166 is keyed to this sleeve and is retained in place by a washer 174 mounted on the shouldered portion 169 of the clutch shaft.

Auxiliary motor 161 operates continuously and hence drives the auxiliary slip clutch sprocket 166 all the time. When the clutch shaft 123 is being driven by the main shaft 37, the sprocket 166, being rotated at a slower speed, does no work but merely revolves slowly on the friction rings 171 of the auxiliary slip clutch 167. However, when the main driving shaft 37 stops, the auxiliary slip clutch 167 immediately takes hold of the clutch shaft 123 and the latter is then driven by the sprocket 166. The driving pawl 153 and ratchet 155 then becomes ineffective since the pawl remains stationary while the ratchet revolves with the clutch shaft.

In resuming operation of the machine after a period of actuation of the roller G by the auxiliary motor 161, provision is made for bringing the rotation of the intaglio roller back into time with the travel of the web through the machine so that the pattern on the intaglio roller will match up or align with the adhesive pattern already deposited on the web. This is effected by allowing the auxiliary slip clutch 167 to rotate the clutch shaft 123 until the pawl 153 on the helical gear 151 catches up with and engages the one tooth of the ratchet 155. The clutch shaft will then rotate with the main driving shaft 37 in proper time and driving power by way of the auxiliary motor 161 will then become ineffective.

The doctor J which scrapes off the excess adhesive from the intaglio roller G includes a transverse blade 181 (Figs. 9 and 10) which bears against the outer surface of the intaglio roller. The blade is held within a groove 182 formed in a doctor shaft 183 and is adjusted into proper position against the rollers by screws 184 which are threaded into the shaft. The shaft is disposed in a tight fitting socket 185 formed in part in the reservoir 51 and in part in the cover plate 89. This construction prevents leakage of adhesive around the doctor.

The ends of the doctor shaft 183 are carried in arms 187 (Figs. 3, 6, 8, 9 and 10) which are mounted on a pivot shaft 188 retained in suitable bearings formed in the frame brackets 68. The arms are held stationary by removable pins 191 which extend through holes in bosses 192 formed on the arms. The pins project into similar holes provided in lugs 193 formed on the frame brackets 68.

Under normal operating conditions the pins 191 hold the arms 187 and the doctor carried thereon in the position shown in Fig. 9 so that the doctor shaft is firmly seated in its socket 185. By removing the pins 191, the arms and the doctor may be swung back with a hinging action away from the reservoir, as shown in Fig. 10. This action unseats the doctor shaft 183 from its socket and brings the entire doctor unit out in the open so that it may be readily cleaned or replaced as desired.

When in normal operating position the doctor blade 181 is held tightly against the face of the intaglio roller by a pair of links 195. There is one of these links disposed adjacent each end of the shaft 183. One end of each link is secured to a hook 196 which catches over a pin 197 in a lug 198 secured to the doctor shaft 183. The opposite end of the link is hooked into a threaded rod 201 loosely retained in a lug 202 formed on the roller carriage 64. A thumb nut 203 and a lock nut 204 threaded on the rod provides means for adjusting the links and through them the doctor blade to any desired degree of tightness or pressure against the intaglio roller. To remove the doctor from its operating position as for cleaning or repairs, the links 195 may be loosened and their hooks 196 removed from the pins 197 thereby freeing the doctor shaft 183 so that it may be hinged outwardly.

Figure 3:
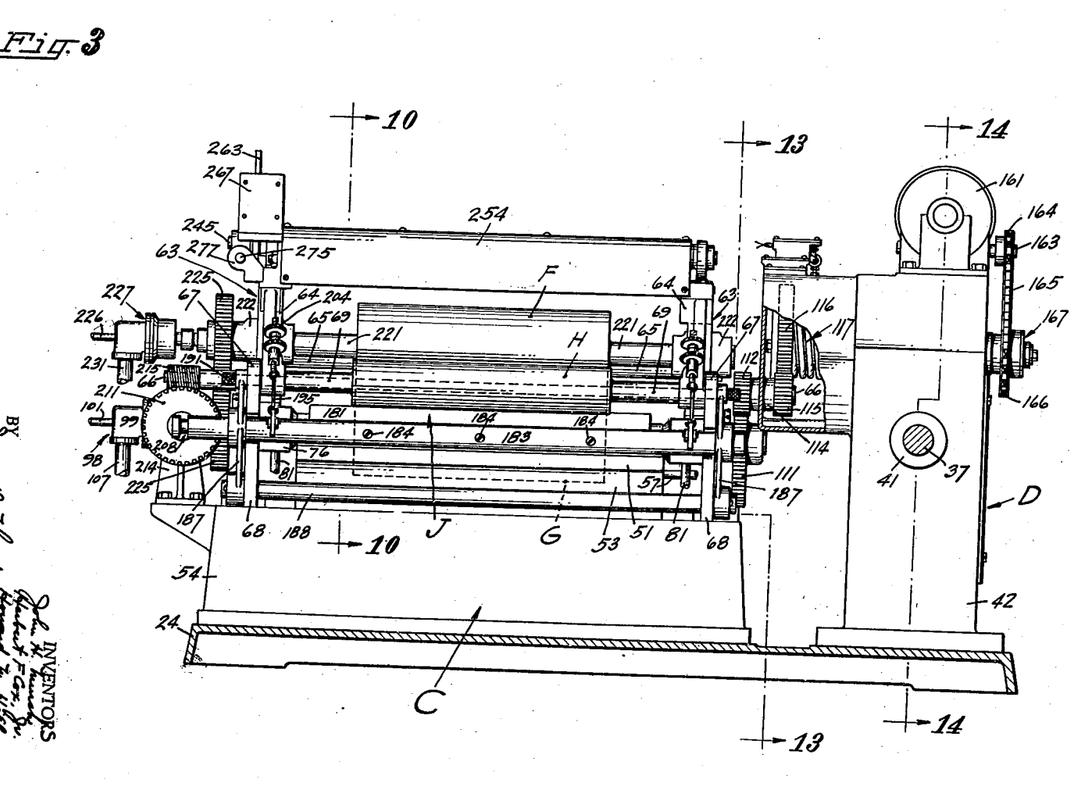
Fig. 3 is an enlarged transverse elevation of the middle portion of the machine as viewed substantially along the line 3—3 in Fig. 1.
Figures 4, 5, 6:
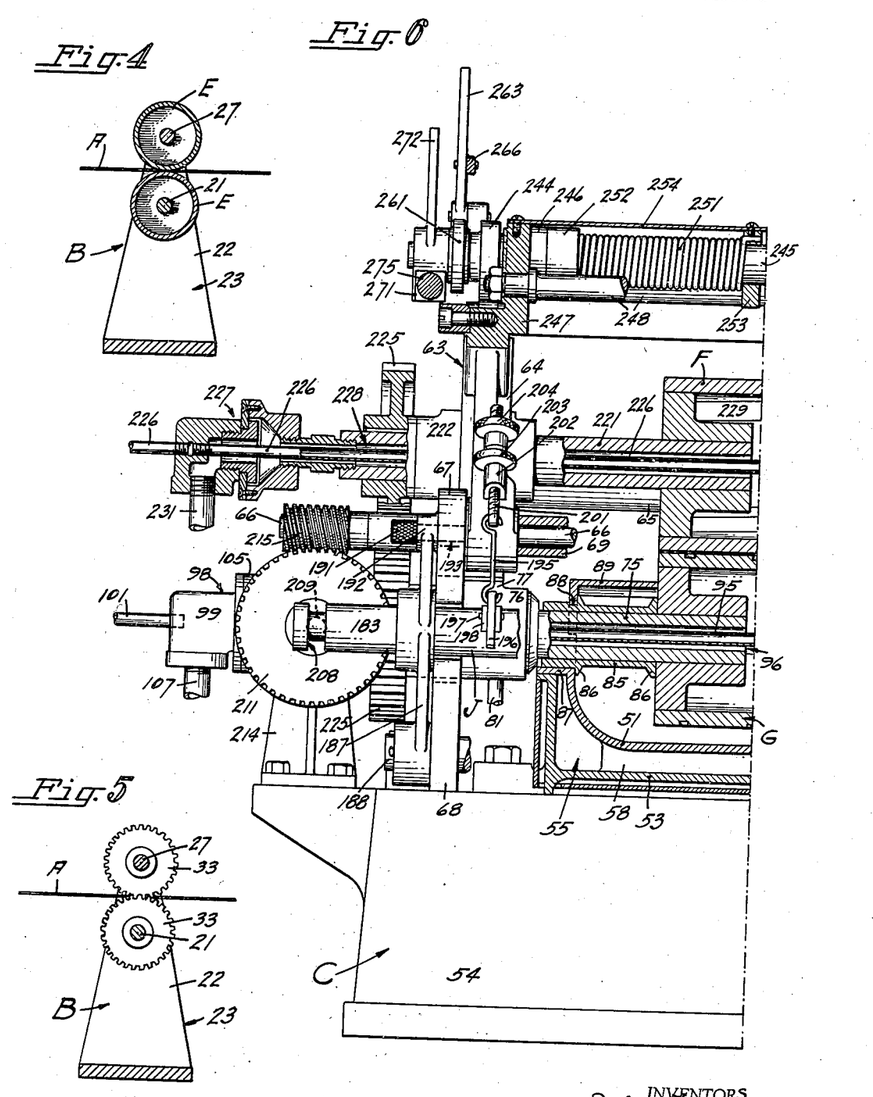
Figs. 4 and 5 are vertical sections taken substantially along the respective lines 4—4 and 5—5 in Fig. 2.
Figs. 6 and 7 when taken together comprise an enlarged sectional view taken substantially along the line 6—6 in Fig. 2.
Figure 7:
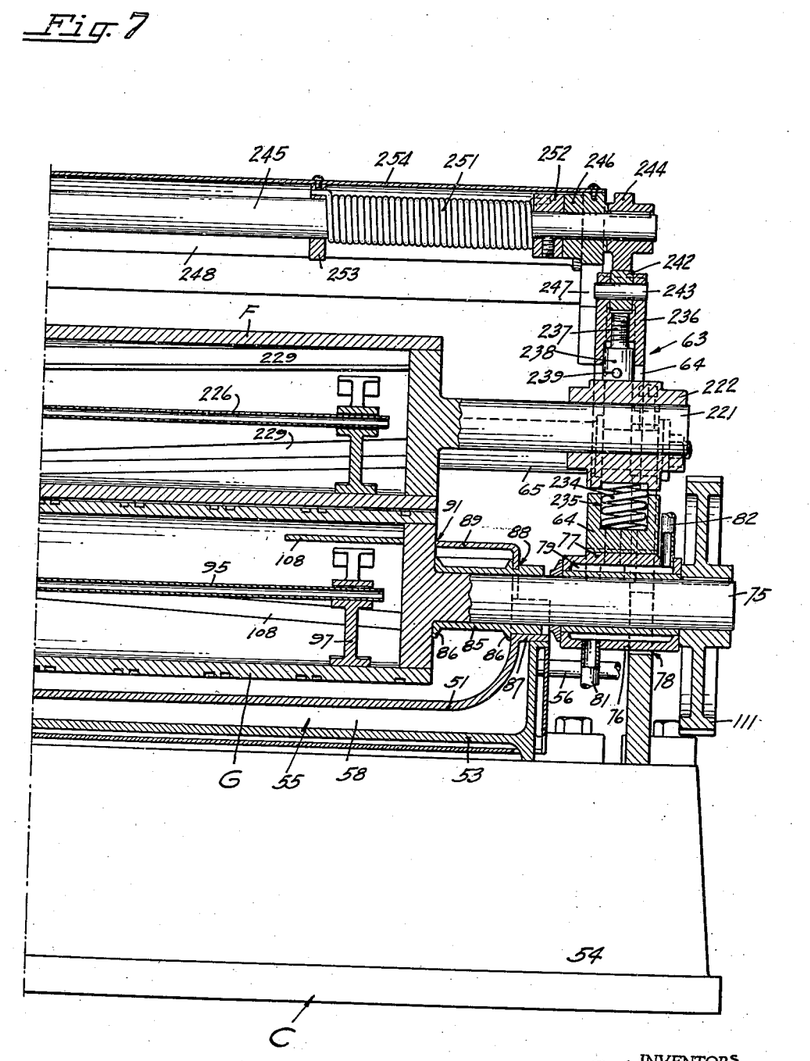

The doctor shaft 183 and the blade 181 carried thereon are longitudinally shifted relative to the intaglio roller G as the latter rotates so that a more even scraping action may be obtained along the roller face. For this purpose one end of the doctor shaft 183 is provided with an annular groove 208 (Figs. 3 and 6).

A crank pin 209 extends into and operates within the groove. The pin 209 is secured in an off center position in the face of a worm wheel 211 (see also Fig. 8) mounted on a stud 212 carried in a bearing 213 formed in a bracket 214 which is bolted to the sub-base 54. The worm wheel meshes with and is rotated by a worm 215 which is mounted on one end of the shaft 66.

The pressure roller F which keeps the web A in engagement with the intaglio roller G during application of adhesive to the web is mounted in the roller carriage 63 on trunnions 221 (Figs. 2, 6 and 7) which are formed at the ends of the roller. Each trunnion is journalled in a bearing block 222 which is carried in vertical slideways 223 (see also Fig. 8) formed in the carriage end members 64.

The pressure roller F is rotated in unison with the intaglio roller G. For this purpose the rollers are geared together by a pair of meshing spur gears 225 (Figs. 2, 3, 6 and 8) which are carried on the roller trunnions 75, 221 of the respective rollers.

The pressure roller F is preferably maintained at a cool temperature so that the adhesive applied to the web by the intaglio roller G will be immediately chilled and set by the pressure roller engaging against the web as hereinbefore explained. Cooling of the pressure roller is effected by circulating a refrigerant, such as cold water or brine through the roller. For this purpose the pressure roller is provided with a circulating system identical with the circulating system provided in the intaglio roller, the cooling fluid being introduced into the pressure roller by way of an inlet tube 226 (Figs. 6 and 7) extending through a universal joint 227 and through a bore 228 in one of the roller trunnions 221.

While in the roller the cooling fluid is agitated by helically curved vanes 229 spaced around the inside of the roller and secured to the roller inner wall. The cooling fluid is discharged from the roller by way of the trunnion bore 228, the universal joint 226, and is discharged through a discharge pipe 231 threadedly secured in the universal joint.

As previously mentioned the pressure roller F is maintained under a pressure while the machine is in operation which pressure is relieved when the machine stops. This is effected through the roller trunnion bearing blocks 222.

These blocks are supported on compression springs 234 (Fig. 7) which are retained in recessed seats 235 formed in the carriage end members 64.

Above each bearing block 222 there is located a pressure block 236 which is also disposed in the slideways 223. This pressure block carries a threaded stud 237 having an enlarged head 238 (see also Fig. 8) which engages against the top of the bearing block. Spanner wrench holes 239 are provided in the head so that the stud may be vertically adjusted. This adjustment is provided for regulating the pressure of the pressure roller F on the web passing between it and the intaglio roller.

Pressure blocks 236 carry cam rollers 242 mounted on pins 243 secured in the blocks. The cam rollers engage against wedge cams 244 which are keyed to the ends of a cam rock shaft 245 carried in bearings 246 formed in side brackets 247 which are bolted to the top of the carriage 63. The side brackets are transversely connected by a pair of tie rods 248 (see also Figs. 9 and 10).

The cam shaft 245 is normally held under a torsional force exerted by a pair of torsion springs 251 which surround the shaft adjacent its bearings. The outer end of each spring is secured in a collar 252 which is fastened to the shaft. The other end of each spring is hooked into a collar 253 which is loosely mounted on the shaft and held stationary by a transverse plate 254 which is secured to the shaft bearings 246. There are two collars 252 and two collars 253.

Figure 8:
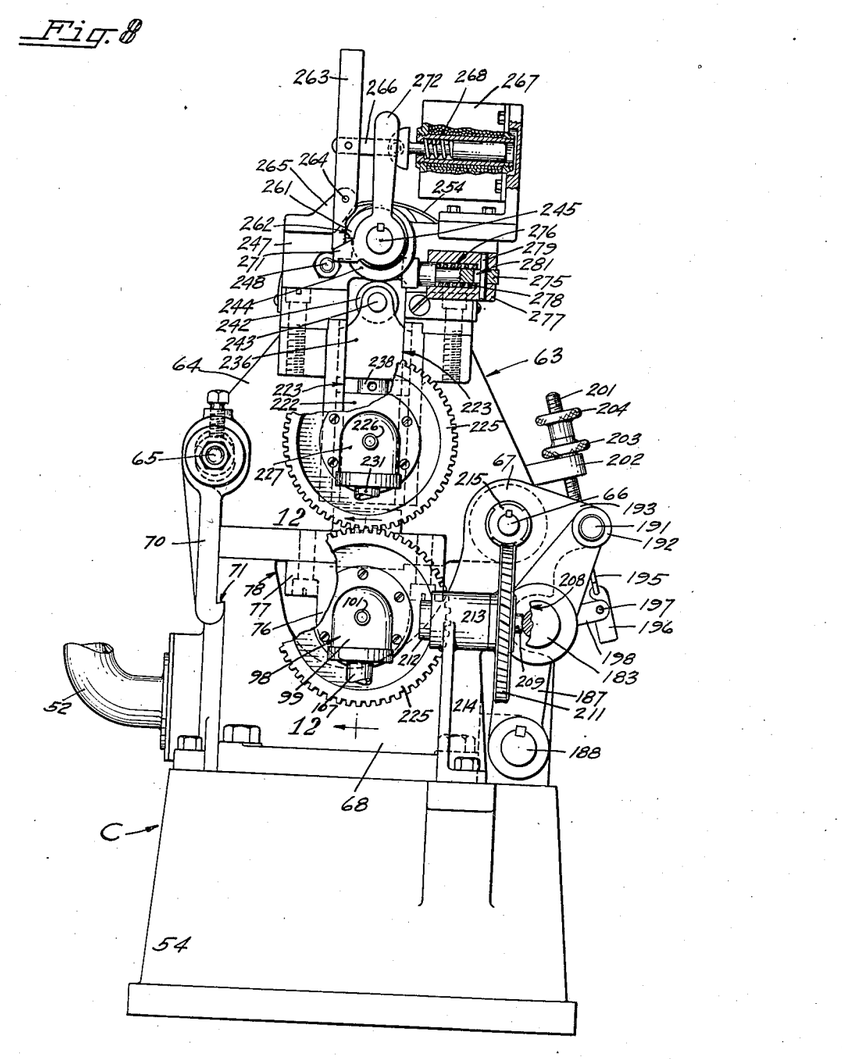
Fig. 8 is an enlarged end view of the middle portion of the machine as viewed from the left in Fig. 3, parts being broken away.

The torsion springs 251 are held against rotating the cam shaft 245 by a special trip device best illustrated in Figs. 6 and 8. This device includes a latch collar 261 which is keyed to one end of the cam shaft 245 and which is formed with a projecting tooth 262. This tooth is engaged by a pawl 263 which is carried on a pivot pin 264 mounted in a lug 265 formed on the bracket 247. The upper end of the pawl is fastened by a link 266 to the core of a normally energized solenoid 267 which is mounted on the bracket 247.

Thus while the latch solenoid 267 is maintained energized its core holds the pawl 263 in locked position against the tooth 262 of the latch collar 261. This holds the shaft 245 against turning under the force exerted by the torsion springs 251. It also holds the shaft 245 in such a position that the wedge cams 244 carried thereon are in their maximum throw position, bearing down on the cam rollers 242 so that the pressure roller F is forced down against the web passing between it and the intaglio roller.

When for any reason the machine stops, the latch solenoid 267 is deenergized, as will be hereinafter explained in connection with the wiring diagram. Deenergizing of the solenoid allows its core to be moved outwardly under the action of a compression spring 268 (Fig. 8) which is housed in the solenoid. This movement of the solenoid core shifts the pawl 263 away from the latch collar tooth 262 and thereby frees the latch collar and the cam shaft 245 so that the latter will be rocked by the torsion springs 251.

Rocking of the cam shaft revolves the wedge cams 244 so that their high points ride off of the cam rollers 242 and thereby permit the pressure roller bearing blocks 222 to move upwardly under the pressure of the springs 234. These springs thus carry the pressure roller F up out of engagement with the intaglio roller. It is this action which permits the web under tension of the idler roller H to lift up away from the intaglio roller when the machine stops.

Cam shaft 245 only rocks through a partial rotation sufficient to relieve the wedging pressure on the pressure roller, and then this rotation is arrested. Further rotation of the shaft is prevented by a stop lug 271 formed on a hand lever 272 keyed onto the end of the cam shaft 245. The stop lug strikes against a cushion stud 275 which is mounted in a bore 276 formed in a boss 277 of the bracket 247. A compression spring 278 coiled around the pin and disposed in the bore supplies the cushioning effect for the stud. The stud is retained in the bore against the force of the spring by a pin 279 which is secured in the boss and which extends through a slot 281 formed in the rear end of the stud.

The hand lever 272 is utilized to manually restore the wedging pressure to the pressure roller F when the machine is again started, after the latch solenoid has again been energized. This returning of the lever is done by swinging the hand lever, in a clockwise direction, as viewed in Fig. 8. This movement of the hand lever rocks the cam shaft 245 back into its original position against the force of the torsion springs 251.

Rotation of the cam shaft 245 forces down the wedge cams 244 on the cam rollers 242 which accordingly depress the bearing blocks 222 and thus return the pressure roller and the web into working engagement with the intaglio roller. This roller has already been speeded up to rotate in time with the web feeding rollers E so that the web is also moving and the pattern of adhesive thereafter applied will be in the proper place on the web. The pawl 263 now being held by the energized solenoid locks the shaft 245 in place and this action holds the web against the intaglio roller in its working engagement.

It should be understood that after a recess in the operation of the machine the adhesive pattern subsequently applied to the web will not be contiguous with the pattern already on the web. In other words there will be an intervening space on the web which has no adhesive applied thereto. This is due to the fact that the web feeding rollers E begin feeding the web through the machine as soon as the latter is started. This may be before the intaglio roller is rotated at its full speed and will depend on the lapse of time between the movement of the web and the bringing of the web down on the roller by the actuation of the hand lever 272. However, the applied patterns on the web will be in perfect spaced relation so that any subsequent operation performed on the web and depending on perfect spacing of the adhesive pattern thereon may be carried out without fear of misalignment of the patterns.

Reference should now be had to the wiring diagram illustrated in Fig. 11. Both of the electric motors used in the machine, i. e., the main driving motor 45 and the continuously operated auxiliary motor 161, preferably receive electric energy from the same source of supply herein shown as a three phase power line 301. Auxiliary motor 161 receives energy from the power line by way of lead wires 302, 303, 304 which extend through a conventional push button motor starting switch 305. The main driving motor receives its energy by way of lead wires 308, 309, 311 which extend through a conventional push button motor starting switch 312.

To protect the machine against damage in starting provision is made for preventing the starting of the main driving motor 45 until the auxiliary motor 161 is in full operation and also until it is ascertained that no undue strain on the intaglio roller is preventing the latter from turning. For this purpose suitable control circuits are provided and are arranged in series with the motor starting switches.

One of these circuits, indicated by the letter X, includes the slip clutch switch 141 which is connected by wires 315, 316 to the auxiliary motor starting switch 305. Hence when the slip clutch 141 is held open through the action of the slip clutch 117, the control circuit cannot be closed and this prevents starting of the auxiliary motor 161 through its starting switch 305. This also prevents starting of the main driving motor 45 through a second control circuit Y as will now be explained.

The motor starting switch 312 of the main driving motor 45 is connected in series by a pair of wires 318, 319 to terminals 321, 322 of a solenoid relay 323. This relay is connected by wires 325, 326 to the respective wires 303, 304 of the auxiliary motor power line. Hence it is only when the auxiliary motor 161 is in operation that electric energy from lead wires 303, 304 passes along wires 325, 326 to energize the relay 323. This closes the relay at its contacts 321, 322 and permits closing of the control circuit connected into the main driving motor starting switch 312. It is only when this control circuit is closed that actuation of the starting switch 312 will start the main driving motor 45.

Provision is also made for stopping the main driving motor 45 without affecting the continuous operation of the auxiliary motor 161. This is brought about by a control circuit Z which includes the pressure roller solenoid controlled latch switch 267 and a solenoid relay 328. The latch switch 267 preferably receives electric energy from a separate source of supply such as a generator 331. One terminal of the generator is connected by a wire 332 to one side of the latch switch. The other terminal of the generator is connected by a wire 333 to a contact 334 of the relay 328. A second contact 335 of relay 328 is connected by a wire 336 to the latch solenoid 267. The relay 328 is connected by wires 338, 339 to the respective wires 309, 311 of the main driving motor power line.

Thus when the driving motor 45 is in operation, electric energy from its power line passes along the wires 338, 339 and energizes the relay 328. This closes the contacts 334, 335 and effects a transmission of energy from generator 331 to the latch solenoid 267. It is this energy which holds the pressure roller latch locked and thereby holds the pressure roller F against the web A and the intaglio roller G as hereinbefore explained.

If for any reason the main driving motor 45 is stopped, the relay 328 will be deenergized and the control circuit Z is thereby broken. The solenoid controlled latch switch 267 will then become deenergized without affecting the operation of the auxiliary motor 161. It is this deenergizing action which frees the latch on the pressure roller F and which permits the latter and the web A to be raised clear of the intaglio roller G while the latter continues to rotate at a slower speed, as hereinbefore explained.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A machine for applying thermoplastic adhesive in fluid form to web material, comprising in combination; a receptacle for holding the adhesive, heating means for maintaining the adhesive in said receptacle in a fluid condition, a rotatable intaglio roller pivotally mounted on said receptacle for removing the adhesive therefrom and for applying it to a web of material passed over said roller, said pivotal mounting permitting said roller to be moved bodily into and out of said receptacle.

2. A machine for applying thermoplastic adhesive in a restricted pattern and in fluid form to web material, comprising in combination, a receptacle for holding the adhesive, heating means for said receptacle adapted to maintain the adhesive in a fluid condition, coacting rollers normally held together under pressure and between which the web material passes when receiving the adhesive, one of said rollers being disposed in the heated adhesive in the receptacle and being provided with an intaglio outer surface, driving means for rotating said rollers, a doctor blade having a wiping edge bearing on the outer surface of said intaglio roller, said doctor blade scraping off all of the adhesive on the intaglio roller except that in the recesses and which is to be applied to the web material, and means actuated and rendered effective by said driving means for releasing the pressure between said rollers when the machine ceases to operate.

3. A machine for applying thermoplastic adhesive in a restricted pattern and in fluid form to web material, comprising in combination, a receptacle for holding the adhesive, a heating jacket surrounding said receptacle and adapted for circulation of a fluid heating medium to maintain the adhesive at a predetermined temperature, a rotatable intaglio roller disposed in and movably mounted on the receptacle for removing heated fluid adhesive therefrom and for applying it to a web material passed over said roller, a doctor blade bearing on the intaglio surface of said intaglio roller and leaving a deposit of the adhesive on the roller for application to the web material, said movable mounting permitting said roller to be moved as a unit into and out of said receptacle.

4. A machine for applying thermoplastic adhesive in fluid form to web material, comprising in combination, a receptacle for holding the adhesive, a heating jacket surrounding said receptacle and adapted for circulation of a fluid heating medium to maintain the adhesive at a predetermined temperature, a rotatable intaglio roller disposed in the receptacle for removing heated fluid adhesive therefrom and for applying it to a web of material passed over said roller, a pressure roller located adjacent said intaglio roller for pressing the web into engagement with said intaglio roller, driving means for rotating said rollers in timed relation, a doctor blade bearing on the intaglio surface of said intaglio roller and leaving a deposit of the adhesive on the roller for application to the web material as a predetermined pattern, and means rendered effective when the machine ceases operation for moving said pressure roller bodily away from said intaglio roller to relieve pressure on said web of material.

5. A machine for applying thermoplastic adhesive in a restricted pattern and in fluid form to web material, comprising in combination; a receptacle for holding the adhesive, a rotatable intaglio roller in said receptacle for removing adhesive therefrom and for applying it to a web of material passed over said roller, a doctor blade bearing on said intaglio roller and scraping off all of the adhesive except that in the intaglio recesses of the roller as the latter rotates, a pressure roller pressing the moving web material against the rotating intaglio roller, driving means for rotating said rollers, devices for holding said pressure roller under pressure against the web and the intaglio roller, and means rendered effective when the machine ceases operation for moving said pressure roller bodily away from said intaglio roller to relieve pressure on said web of material.

6. A machine for applying thermoplastic adhesive in fluid form to web material, comprising in combination; a receptacle for holding the adhesive, a rotatable intaglio roller in said receptacle for removing adhesive therefrom and for applying it to a web of material passed over said roller, a pressure roller for pressing the moving web material against the rotating intaglio roller, driving means for rotating said rollers in timed relation, devices for holding said pressure roller under pressure against the web and the intaglio roller, and instrumentalities actuated and rendered effective by said driving means for releasing said pressure on said pressure roller when the machine stops.

7. A machine for applying thermoplastic adhesive in fluid form to web material, comprising in combination: a receptacle for holding the adhesive, a rotatable intaglio roller in said receptacle for removing adhesive therefrom and for applying it to a web of material passed over said roller, a pressure roller for pressing the moving web material against the rotating intaglio roller, driving means including an electric motor and interposed gearing for rotating said rollers, means for holding said pressure roller under pressure against the web and the intaglio roller, means in electric circuit with said driving motor and connected to said holding means to release the same when the machine stops, and means for moving said pressure roller away from said intaglio roller when said holding means are released.

8. A machine for applying thermoplastic adhesive in fluid form to web material, comprising in combination: a receptacle for holding the adhesive, a rotatable intaglio roller in said receptacle for removing adhesive therefrom and for applying it to a web of material passed over said roller, a pressure roller for pressing the moving web material against the rotating intaglio roller, driving means including an electric motor and interposed gearing for rotating said rollers, means for holding said pressure roller under pressure against the web and the intaglio roller, means in electric circuit with said driving motor and connected to said holding means to release the latter from said pressure holding engagement when the machine stops, means for removing said pressure roller away from said intaglio roller when the pressure therebetween is released, and means operative at the time of removal of said pressure roller from said intaglio roller for separating the web material from the intaglio roller so that the web will be clear of the intaglio roller while the machine is at rest.

9. A machine for applying thermoplastic adhesive in a restricted pattern and in fluid form to web material, comprising in combination, a receptacle for holding the adhesive, heating means for said receptacle adapted to maintain said adhesive in a fluid condition, an intaglio roller located in and pivotally mounted on said receptacle for removing fluid adhesive therefrom and for applying it to a web of material passed over said roller, means for heating said intaglio roller, a doctor blade bearing on the intaglio surface of said roller and leaving a deposit of the adhesive on the roller for application to the web material, said pivotal mounting of said roller permitting the same to be swung bodily into and out of said receptacle.

10. A machine for applying thermoplastic adhesive in fluid form to web material, comprising in combination, a receptacle for holding the adhesive, a hollow intaglio roller pivotally mounted on said receptacle for removing adhesive in pattern form therefrom and for applying the pattern to a web of material passed over said roller, means for rotating said roller, means for heating said roller by circulating a fluid heating medium therethrough, a doctor blade bearing on the intaglio surface of said roller and leaving a deposit in pattern form of the adhesive on the roller for application to the web material, said pivotal mounting permitting said intaglio roller to be swung bodily towards and away from said receptacle.

11. A machine for applying thermoplastic adhesive in fluid form to web material, comprising in combination, a receptacle for holding the adhesive, heating means for said receptacle adapted to maintain said adhesive in a fluid condition, coacting rollers between which the web material passes when receiving the adhesive, one of said rollers being internally heated and being disposed in the heated adhesive in the receptacle and being provided with an intaglio outer surface, and another of said rollers being chilled and being pressed against the web to chill the adhesive applied to the web by the said internally heated roller, said rollers having a pivotal mounting on said receptacle and movable as a unit towards and away from the latter.

12. A machine for applying thermoplastic adhesive in fluid form to web material, comprising in combination, a carriage, a receptacle mounted adjacent said carriage for holding the adhesive, heating means for said receptacle adapted to maintain said adhesive in a fluid condition, an intaglio roller in said receptacle and carried in bearings in said carriage for removing fluid adhesive from the receptacle and for applying it to a web of material passed over said roller, and cooling means for said bearings including circulation of a cooling medium therethrough.

13. A machine for applying thermoplastic adhesive in fluid form to web material, comprising in combination, a machine base, a receptacle mounted on said machine base for holding the adhesive, a carriage hingedly mounted on said machine base adjacent said receptacle, means for locking said carriage in operative position on said base, an intaglio roller supported in said carriage and located in said receptacle when the carriage is in operative position for removing fluid adhesive from the receptacle and for applying it to a web of material passed over said roller, a pressure roller also carried in said carriage for pressing the web material against said intaglio roller, and actuating devices for rotating said rollers in timed relation, said carriage and the rotating rollers carried therein being movable away from said adhesive receptacle when the carriage is unlocked so that access may be had to the interior of said receptacle and to the rollers while maintaining the timed rotation relation of said rollers.

14. A machine for applying thermoplastic adhesive in a restricted pattern and in fluid form to web material, comprising in combination; a receptacle for holding the adhesive, heating means for said receptacle adapted to maintain said adhesive in a fluid condition, a rotatable intaglio roller in said receptacle for removing fluid adhesive therefrom and for applying it to a web of material passed over said roller, a doctor blade having a wiping edge bearing on the intaglio surface of said roller, said doctor blade scraping off all of the adhesive on the roller except that in the intaglio recesses which is applied to the web material, web feeding devices disposed adjacent said intaglio roller for feeding the web over said intaglio roller in time with the rotation of the latter, means for rotating said intaglio roller and driving said web feeding devices in timed relation, and auxiliary driving means for rotating said intaglio roller independently of the aforesaid rotating and driving means when the latter cease operation.

15. A machine for applying thermoplastic adhesive in fluid form to web material, comprising in combination; a receptacle for holding the adhesive, heating means for said receptacle adapted to maintain said adhesive in a fluid condition, a rotatable intaglio roller in said receptacle for removing fluid adhesive therefrom and for applying it to a web of material passed over said roller, a pressure roller adjacent said intaglio roller for pressing said web against the intaglio roller, web feeding devices for feeding the web between the pressure roller and the intaglio roller, means for maintaining the web taut while being so fed, means for driving said rollers and said web feeding devices in timed relation, and auxiliary means for driving said intaglio roller when the aforesaid driving means are at rest.

16. A machine for applying thermoplastic adhesive in fluid form to web material, comprising in combination; a receptacle for holding the adhesive, heating means for said receptacle adapted to maintain said adhesive in a fluid condition, a rotatable intaglio roller in said receptacle for removing fluid adhesive therefrom and for applying it to a web of material passed over said roller, driving means for rotating said intaglio roller, and slip clutch devices between said intaglio roller and its driving means for disconnecting the intaglio roller from the driving means when the intaglio roller is held against rotation.

17. A machine for applying thermoplastic adhesive in a restricted pattern and in fluid form to web material, comprising in combination; a receptacle for holding the adhesive, heating means for said receptacle adapted to maintain said adhesive in a fluid condition, a rotatable intaglio roller in said receptacle for removing fluid adhesive therefrom and for applying it to a web of material passed over said roller, a doctor blade having a wiping edge bearing on the intaglio surface of said roller for scraping off all the adhesive on the roller except that in the intaglio recesses which is to be applied to the web material, driving means for actuating the machine including the rotation of said intaglio roller, instrumentalities for starting and stopping said driving means, and auxiliary driving means for maintaining the rotation of said intaglio roller when the machine is made inoperative by said instrumentalities.

18. A machine for applying thermoplastic adhesive in fluid form to web material, comprising in combination, a receptacle for holding the adhesive, heating means for said receptacle adapted to maintain said adhesive in a fluid condition, a rotatable intaglio roller in said receptacle for removing fluid adhesive therefrom and for applying it to a web of material passed over said roller, driving mechanism for said intaglio roller, said driving mechanism rotating said intaglio roller at full speed while the machine is in operation, and auxiliary driving mechanism for rotating said roller at a reduced speed when the machine is not operating.

19. A machine for applying thermoplastic adhesive in fluid form to web material, comprising in combination, a receptacle for holding the adhesive, a rotatable intaglio roller in said receptacle for removing fluid adhesive therefrom and for applying it to a web of material in a series of recurring patterns, feed rollers for advancing said web over said intaglio roller and in definite relation thereto so that the individual adhesive patterns received on the web will bear a predetermined relation to each other, driving means for rotating said feed rollers and said intaglio roller in synchronism while the machine is operating, auxiliary driving means for independently rotating said intaglio roller when said feed rollers are inoperative, and timing elements for synchronizing the rotation of said feed rollers and said intaglio roller following a pause in the operation of said feed rollers and in the web advanced thereby.

20. A machine for applying thermoplastic adhesive in fluid form to web material, comprising in combination, a receptacle for holding the adhesive, a rotatable intaglio roller in said receptacle for removing fluid adhesive therefrom and for applying it to a web of material in a series of recurring patterns, feed rollers for advancing said web over said intaglio roller and in definite relation thereto so that the individual adhesive patterns received on the web will bear a predetermined relation to each other, driving means for rotating said feed rollers and said intaglio roller in synchronism while the machine is operating, means for separating the web from said intaglio roller when said feed rollers stop operating, auxiliary driving means for independently rotating said intaglio roller when said feed rollers are inoperative, timing elements for synchronizing the rotation of said feed rollers and said intaglio roller following a pause in the operation of said feed rollers and in the web advanced thereby, and manual means for bringing the web into engagement with the intaglio roller after the latter has been brought into timed relation with said feed rollers.

JOHN H. MURCH.
HERBERT F. COX, Jr.
HOWARD M. HILL.
JOHN E. ROBINSON.